United States Patent [19]

Stephenson

[11] Patent Number: 4,956,767

[45] Date of Patent: Sep. 11, 1990

[54] DATA PROCESSING SYSTEM WITH MODEL FOR STATUS ACCUMULATING OPERATION BY SIMULATING SEQUENCE OF ARITHMETIC STEPS PERFORMED BY ARITHMETIC PROCESSOR

[75] Inventor: R. Ashley Stephenson, Tewksbury, Mass.

[73] Assignee: Stellar Computer, Inc., Newton, Mass.

[21] Appl. No.: 159,179

[22] Filed: Feb. 23, 1988

[51] Int. Cl.⁵ .................. G06F 7/46; G06F 9/455; G06F 15/36; G06F 15/46
[52] U.S. Cl. .................... 364/200; 364/232.3; 364/232.7; 364/232.8; 364/258; 364/258.1; 364/259; 364/263; 364/221.1; 364/149; 364/578
[58] Field of Search ............... 364/200, 900, 149, 578

[56] References Cited

U.S. PATENT DOCUMENTS

| | | | |
|---|---|---|---|
| 3,969,722 | 7/1976 | Danco et al. | 364/200 |
| 4,064,394 | 12/1977 | Allen | 364/200 |
| 4,120,043 | 10/1978 | Su | 364/900 |
| 4,326,263 | 4/1982 | Given et al. | 364/900 |
| 4,342,093 | 7/1982 | Miyoshi | 364/578 |
| 4,357,678 | 11/1982 | Davis | 364/900 |
| 4,541,071 | 9/1985 | Ohmori | 364/900 |
| 4,654,812 | 3/1987 | Yoshida | 364/578 |
| 4,729,105 | 3/1988 | Thompson et al. | 364/478 |
| 4,775,950 | 10/1988 | Terada et al. | 364/578 |
| 4,891,773 | 1/1990 | Ooe et al. | 364/578 |

OTHER PUBLICATIONS

S. G. Tucker, "The IBM 3090 System: An Overview", IBM Systems Journal, vol. 25, No. 1, 1986, pp. 4–19.
W. Buchholz, "The IBM System/370 Vector Architecture", IBM Systems Journal, vol. 25, No. 1, 1986, pp. 51–62.
R. S. Clark et al., "Vector System Performance of the IBM 3090", IBM Systems Journal, vol. 25, No. 1, 1986, pp. 63–82.
D. H. Gibson et al., "Engineering and Scientific Processing on the IBM 3090", IBM Systems Journal, vol. 25, No. 1, 1986, pp. 36–50.
Y. Singh, "IBM 3090 Performance: A Balanced System Approach", IBM System Journal, vol. 25, No. 1, 1986, pp. 20–35.

Primary Examiner—Archie E. Williams, Jr.
Assistant Examiner—Emily Y. Chan
Attorney, Agent, or Firm—Fish & Richardson

[57] ABSTRACT

A method accumulates the status of the execution of an arithmetic operation by an arithmetic processor having hardware elements for performing the steps of the operation, where each step is based on one or more operands and produces an intermediate or final result and possibly produces a corresponding status indicator. The method includes simulating the hardware elements in a model that performs simulated steps analogous to the steps performed by the hardware elements, each simulated step resulting in an intermediate or final status result; and while the arithmetic processor executes the arithmetic operation, applying each status indicator to the point in the model that corresponds to the point in the arithmetic processor where the result corresponding to the status indicator is applied, whereby the final result of the operation of the model will represent the accumulated status of the execution of the arithmetic operation.

12 Claims, 3 Drawing Sheets

DATA PROCESSING SYSTEM WITH MODEL FOR STATUS ACCUMULATING OPERATION BY SIMULATING SEQUENCE OF ARITHMETIC STEPS PERFORMED BY ARITHMETIC PROCESSOR

BACKGROUND OF THE INVENTION

This invention relates to generating and accumulating status information associated with a data processing operation.

For example, in a vector operation (in which the same steps—e.g., add, multiply, accumulate—are performed on all data elements of the vector) it is useful to generate and accumulate the status (e.g., overflow, underflow, result) of each step to aid subsequent generation of exception conditions The status information typically is generated in a standard (e.g., IEEE 754) format.

Status information may be accumulated on a step by step basis and assembled as a status word (indicating the status of each step). In the case of a complex algorithm, e.g. for a vector operation, many steps are needed to produce a result, and the user typically does not need to know that a given step caused an overflow but only whether an overflow (or other exception) was generated somewhere among the steps that led to a particular result.

Sometimes status for a vector operation is generated by including, in the vector algorithm, microcode instructions to specify when status should be accumulated.

SUMMARY OF THE INVENTION

A general feature of the invention provides a method for accumulating the status of the execution of an arithmetic operation by an arithmetic processor having hardware elements for performing the steps of the operation, where each step is based on one or more operands and produces an intermediate or final result and produces possibly a corresponding status indicator; the method includes simulating the hardware elements in a model that performs simulated steps analogous to the steps performed by the hardware elements, each simulated step producing an intermediate or final status result; while the arithmetic processor is executing the arithmetic operation, each status indicator is applied to the point in the model that corresponds to the point in the arithmetic processor where the result corresponding to the status indicator is applied; the final result of the operation of the model will represent the accumulated status of the execution of the arithmetic operation.

Preferred embodiments of the invention include the following features. The model performs an accumulation operation to simulate each arithmetic operation performed by the arithmetic processor. The model comprises an exception processor having hardware elements corresponding to the hardware elements of the arithmetic processor, and the arithmetic and exception processors are controlled by analogous stored programs.

At any point in the arithmetic operation, an operand or result anywhere in the arithmetic processor has a corresponding status value in the exception processor. Accordingly, even if the data is the result of a complex vector operation, the associated status value will represent an accumulation of the status from each of the steps up to that point. With this arrangement, the microcode is freed from the task of status accumulation, and, so long as the algorithm generates the correct data result, the correct status is inherently generated and available.

Other advantages and features will become apparent from the following description of the preferred embodiment and from the claims.

DESCRIPTION OF THE PREFERRED EMBODIMENT

We first briefly describe the drawings.

STRUCTURE AND OPERATION

Figure 1:
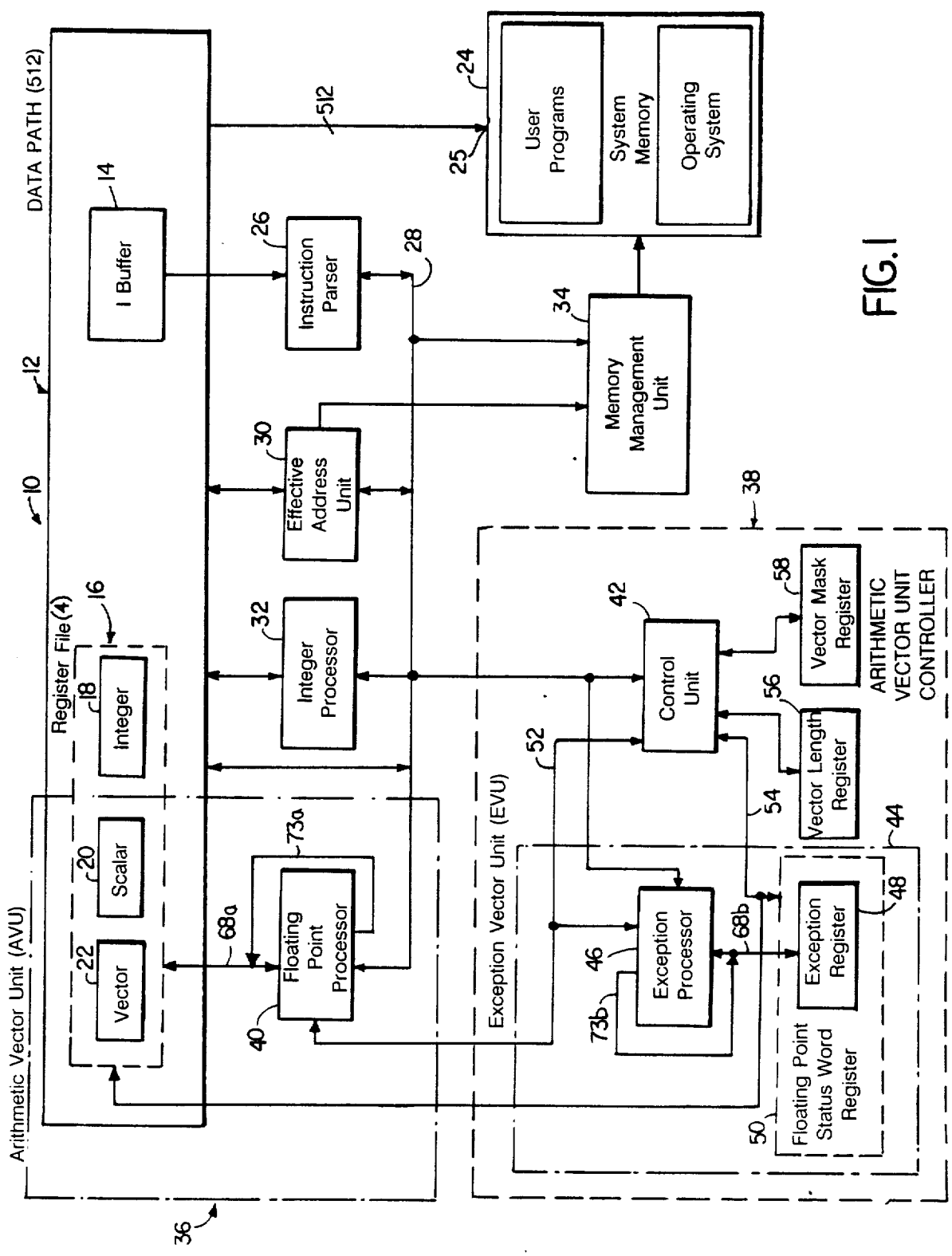
FIG. 1 is a block diagram of a synchronous-pipeline, multi processor (SPMP computer including an arithmetic vector unit and an exception vector unit.

Referring to FIG. 1, synchronous pipeline, multiprocessor computer 10 is organized around a data path 12. Data path 12 is implemented by 32 application specific integrated circuits (ASICs) (i.e., gate arrays, configured and interconnected to form a 512-bit wide path for four streams of the pipeline. Data path 12 includes an instruction buffer (IBuffer) 14 and a set of register files 16 for each stream, each register file 16 including thirty two integer registers 8, eight scalar registers 20, and six 32-element vector registers 22. Registers 18, 20, 22 all receive data from and transmit data to system memory 24 via a 512 bit wide data port 25.

System memory 24 provides instructions for SPMP 10 from a stored operating system and one or more stored user programs, via IBuffers 14, which apply the four streams of instructions in a pipelined sequence to a single instruction parser 26. There the four instruction streams are decoded and sent along instruction pipeline 28 to data path 12, effective address (EA) unit 30, general purpose integer processor 32 and memory management unit 34, which also receives effective (virtual) addresses from EA unit 30 to provide physical addressing and control for system memory 24.

Decoded instructions are also applied to arithmetic vector unit (AVU) 36 and arithmetic vector unit controller 38. Specifically, the decoded instructions are sent to floating point processor 40, which together with scalar registers 20 and vector registers 22 makes up vector unit 36, and to control unit 42 in vector unit controller 38. Floating point processor 40 is commercially available (part nos. 2264, 2265, manufactured by Weitek Corporation of Sunnyvale, Calif.).

Arithmetic vector unit controller 38 includes exception vector unit (EVU) 44 physically incorporated in the hardware of vector controller 38 as a model of AVU 36. While AVU 36 includes floating point processor 40 for performing vector operations (e.g. addition, subtraction, multiplication, and division) on vector (and/or scalar) data supplied by vector registers 22 (and/or scalar registers 20), EVU 44 includes an exception processor 46 for accumulating (simultaneously with the operation of floating point processor 40) status information for each vector operation performed by floating point processor 40. Floating point and exception processors 40, 46 receive identical decoded instructions on pipeline 28. EVU 44 also includes exception register 48, located within floating point status word (FPSW) register 50, for providing initial status information about the vector operands (usually null) to exception processor 46 and receiving status results computed by the exception processor. Control unit 42 applies synchronized control signals to floating point processor 40 and exception processor 46 on line 52, and to scalar and vector registers 20, 22 and exception register 48 via line 54.

Arithmetic vector unit controller 38 also includes a vector length register 56, for maintaining an accurate count of the length of the vector being operated on in AVU 36, and a vector mask register 58. Vector mask register 58 contains a control word having bits corresponding to the elements of the vector, with the state of each bit determining whether control unit 42 will cause the corresponding vector elements to be operated on by AVU 36 (and by EVU 44). Vector length and mask registers 56, 58 are loaded by decoded instructions on pipeline 28 via control unit 42 in a manner to be described.

Figure 2:
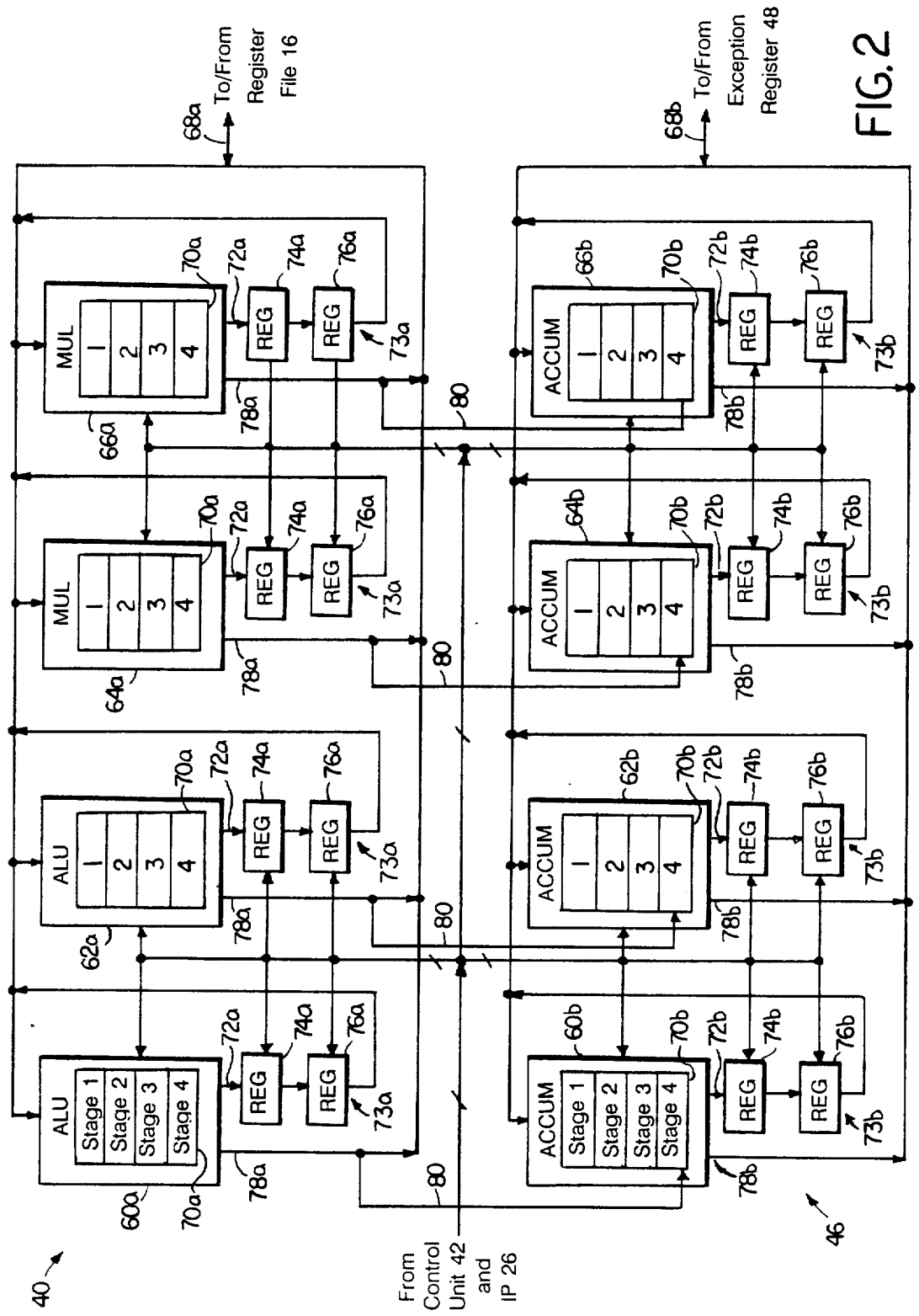
FIG. 2 is a block diagram of portions of the arithmetic and exception vector units.

Referring to FIG. 2, the configuration of exception processor 46 is a stage by stage copy of floating point processor 40. For each arithmetic function unit, there is a corresponding exception function unit.

Floating point processor 40 includes four functional units implemented as a pair of arithmetic logic units (ALUs) 60a, 62a and a pair of multipliers (MULs) 64a, 66a, all connected in parallel and having their input ports connected to registers 20, 22 via input/output bus 68a. Each functional unit 60a, 62a, 64a, 66a responds to decoded instructions from instruction parser 26 and control signals from control unit 42 and includes a four-stage pipeline 70a. Each stage of pipeline 70a is capable of containing an independent operand or result during operation. Results generated by functional units 60a, 62a, 64a, 66a are available only at stage 4 of corresponding pipeline 70a, however.

Results available at stage 4 of the pipeline of each functional unit 60a, 62a, 64a, 66a are coupled via line 72a and transfer matrix 73 back to stage I of the pipeline 70a of any functional unit 60a, 62a, 64a, 66a. Transfer matrix 73a comprises a pair of registers 74a, 76a, each responsive to decoded instructions from instruction parser 26 and control signals from control unit 42 and capable of holding an independent result (or operand) during operation. Thus, up to 24 pieces of vector operation data (six per functional unit), in the form of operands and/or results, may exist within floating point processor 40 during operation. The result in stage 4 of pipeline 70a of each ALU 60a, 62a and MUL 64a, 66a is also applied via line 78a directly to input/output bus 68a to allow that result to be written into vector register 22 (or scalar register 20).

Exception processor 46 is likewise a four-functional unit device, comprising four accumulators (ACCUMs) 60b, 62b, 64b, 66b connected in parallel on input/output bus 68b. Accumulators 60b, 62b, 64b, 66b correspond to respective functional units 60a, 62a, 64a, 66a. Accumulators are used in place of ALUs and MULs because exception processor 46 need only accumulate the status of each arithmetic operation performed by floating point processor 40. Accumulators 60b, 62b, 64b, 66b each include four stage pipeline 70b capable of containing status corresponding to the operand or result contained in the corresponding stage of the pipeline 70a of the corresponding functional unit 60a, 62a, 64a, 66a. Status results are available only in stage 4 of each pipeline 70b, however. A status result in pipeline 70b stage 4 of an accumulator 60b, 62b, 64b, 66b is coupled via line 72b and transfer matrix 73b (including a pair of registers 74b, 76b) to the first stage of the pipeline 70b of any accumulator 60b, 62b, 64b, 66b. Thus, during operation, exception processor 46 is capable of containing 24 independent pieces of status information corresponding to the 24 discrete pieces of data in floating point processor 40.

Status results in stage 4 of the pipeline 70b of each accumulator 60b, 62b, 64b, 66b are also applied via line 78b directly to input/output bus 68b to allow that status result to be written into exception register 48. Accumulators 60b, 62b, 64b, 66b and registers 74b, 76b are responsive to the same decoded instructions and control signals as the associated functional units 60a, 62a, 64a, 66a and registers 74a, 76a.

In operation, for each arithmetic function performed by floating point processor 40 on data operands, a corresponding exception function is performed by exception processor 46 on the respective status values for those data operands. For example, while the addition operation:

$$result\ (C) = operand\ (A) + operand\ (B)$$

is being performed in floating point processor 40, the accumulation operation:

$$status\ (C) | status\ (A) | status\ (B)$$

(i.e., accumulated status = status (C) of the addition operation accumulated with the status of operand (A) accumulated with the status of operand (B)) is being performed in exception processor 46. Other examples of the corresponding functions of AVU 36 and EVU 44 are:

| AVU 36 | EVU 44 |
| --- | --- |
| subtract A − B | accumulate (or) |
| multiply A + B | accumulate (or) |
| select A or B | accumulate A\|B |
| NOP (no operation) | hold previous status |

At any given time, a data operand or result located in one of the 24 stages of floating point processor 40 has an associated status located in a corresponding stage of exception processor 46. As operands and/or results are routed through the stages of floating point processor 40, the corresponding status values are accumulated and identically routed through the stages of exception processor 46. When floating point processor 40 has computed a final result of a given vector algorithm (i.e. completed the necessary vector operations to produce the result), exception processor 46 has likewise accumulated a final status for that result, providing the user with the accumulated status for the vector algorithm result.

Figure 3:
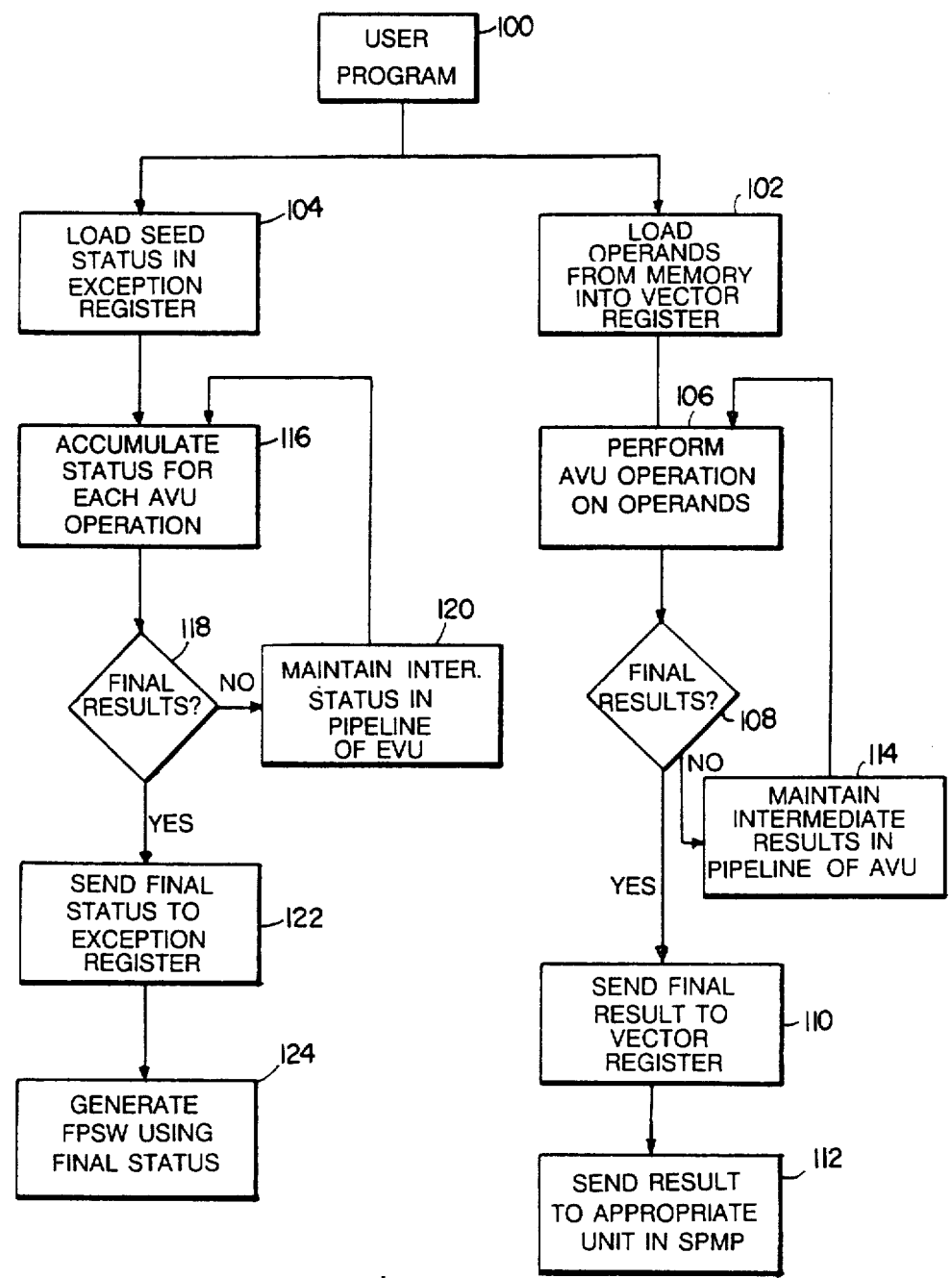
FIG. 3 is a flow chart of status accumulation.

Referring to FIG. 3, for example, when a vector operation is to be performed by a given instruction stream during the execution of a user program (100), a sequence of instructions decoded by instruction parser 26 causes system memory 24 (via effective address unit 30 and memory management unit 34) to transfer the data vectors (i.e. the operands) to the vector registers 22 of that stream (102). The IEEE 754 exception status for a data element residing in main memory is considered to be non-existent; that is, the status history of the operand is not known. Thus, while the data operands are being loaded into vector registers 22 a decoded instruction on pipeline 28 instructs control unit 42 to load a "seed status" (e.g., null) into exception register 48 (104). The user program could alternately specify that a finite seed status be loaded into exception register 48 for one or more data operands.

Initial instructions of the vector operation sequence also set the length of the vector in register 56 and set or reset a mask bit for each vector element in register 58. A set mask for a given vector element causes control unit 42 not to apply that vector element for operation by floating point processor 40. That is, a vector element will be passed over, and no operation performed on it, when its mask bit is set in register 58. Control unit 42 likewise causes exception processor 46 not to accumulate status for vector elements having their mask bits set.

Arithmetic vector unit performs the vector operation or operations (106) specified by the instruction stream on pipeline 28 on the non-masked elements of the data operands. Floating point processor 40, under the control of control unit 42, obtains the elements of the data operands from vector registers 22, loads them into stage 1 of pipeline 70a of an ALU 60a, 62a or a MUL 64a, 66a, and performs the vector operation (106) specified by the instruction. If the result of the operation, available in pipeline 70a stage 4 of that functional unit, is the final result (108) of the vector operation sequence, control unit 42 generates a write pulse on line 52 to write the final result (110) into vector registers 22. From vector registers 22, the final result is sent elsewhere in SPMP 10 according- to subsequent instructions (112).

If more operations need to be performed, the intermediate result (114) remains in floating point processor 40 and the next step of the vector operation is performed. Specifically, the intermediate result is "captured" (i.e., loaded) into register 74a of the transfer matrix 73a corresponding to the functional unit 60a, 62a, 64a, 66a that generated the intermediate result. Subsequent instructions on pipeline 28 cause control unit 42 to apply the intermediate result via register 76a to the first stage of pipeline 70a of a functional unit 60a, 62a, 64a, 66a along with a new operand from vector register 22, and the next vector operation is performed.

As the steps of the arithmetic vector operation are being performed, the status is being accumulated in exception processor 46 and routed among the same stages in exception processor 46 as the operands and/or results are routed in floating point processor 40. Thus, exception processor 46, under the direction of control unit 42, obtains the seed status of the data operands from exception register 48 as those data operands are being sent to floating point processor 40. The seed status is loaded into stage 1 of pipeline 70b of the accumulator 60b, 62b, 64b, 66b which corresponds to the functional unit 60a, 62a, 64a, 66a being loaded with the data operand. As the operands are operated on by the functional units 60a-66a of floating point processor 40, the status values of these steps are accumulated (116) in the corresponding functional units 60b-66b of exception processor 46.

For example, consider a multiplication operation performed on vector operands (A) and (B) in MUL 64a. As operands (A) and (B) are being loaded in stage 1 of the multiplier's pipeline 70a, status (A) and status (B) of the respective operands are simultaneously being loaded in stage 1 of pipeline 70b of corresponding accumulator 64b. As the data multiplication operation proceeds, operands (A) and (B) are multiplied in pipeline stages 2 and 3 and the multiplication operation is completed in stage 4 of pipeline 70a. The result (C) is available on line 78a and includes both data and the status generated by the multiplication operation (e.g. whether the operation produced an overflow, underflow, etc.). This "current status" is applied directly to stage 4 of pipeline 70b of corresponding accumulator 64b via line 80.

As the data multiplication is proceeding in MUL 64a, status (A) is accumulated with status (B) in pipeline stage 2 and 3 of ACCUM 64b. As the multiplication result enters stage 4 of MUL 64a, the accumulation of status (A) and status (B) enters ACCUM 64b stage 4 and the "current status" on line 80 also enters stage 4 of the pipeline of ACCUM 64b, where it is immediately accumulated with the accumulated status (A) and (B) to yield a status which represents the status history of each operand and the status generated by multiplication operation. As the data result is routed through the pipeline stages of floating point processor 40 in subsequent steps of the arithmetic operation, the accumulated status is routed through the identical stages of exception processor 46, and is accumulated with any other status information generated as a result of the subsequent arithmetic operations.

A given status value in the pipeline of exception processor 46 becomes a final status value (118) only if the corresponding data result in floating point processor 40 is the final result of the steps of vector operation. If not, the intermediate status is maintained in the pipeline 70b of exception processor 46 (120) for accumulation with status information generated as a result of subsequent steps of the vector operation.

If the status result is final, it is loaded in exception register 48 (122) as the corresponding final data result is being loaded in vector registers 22. Exception register 48 is part of the floating point status register 50, which contains a floating point status word (FPSW). The status accumulated for the final data result and loaded in exception register 48 forms a portion of the FPSW (124). Other parts of the FPSW are generated by control unit 42, vector length register 56, and vector mask register 58. Additionally, the user program may set certain bits of the FPSW as initial conditions, via effective address unit 30 acting through control unit 42 in response to decoded instructions on pipeline 28.

The FPSW is generated for each vector operation result and is routed via control unit 42 onto pipeline 28 to effective address unit 30. The FPSW is then sent back on pipeline 28, through integer processor 32, to an integer register 18. From there, the FPSW may be processed to determine, based on the contents of the FPSW, whether to take a trap (i.e. discontinue executing normal user program instructors for that stream) and service the trap with a trap handling routine stored in main memory 24.

Because the tracking of status is done in hardware, the microcode programmer may construct any algorithm which will run on AVU 36, knowing that as each final result is generated the correct IEEE status for the result is also available. The programmer is also able to implement alternate schemes for reporting exceptions in place of using the FPSW. For example, processing may be interrupted upon the first occurrence of any exception generated anywhere in the pipeline of exception processor 46. This permits the rap service routine to be implemented immediately to correct the problem and restart the vector operation. Alternately, exception masks may be used, with each generated exception setting a bit in the mask. At the end of a vector operation, the elements that caused the exceptions are identified by the bits set in the mask.

Other embodiments are within the following claims.

What is claimed is:

1. A method for accumulating a status of execution of an arithmetic operation that comprises a sequence of steps, by an arithmetic processor having hardware elements for performing said sequence of steps, where said step is performed on one or more operands that have status values and produces an intermediate or final arithmetic result and can produce a corresponding status indicator, said method comprising simulating said hardware elements in a model that performs simulated steps on said status values analogous to the sequence of steps performed by said hardware elements on said operands that have said status values, said simulated steps including an accumulation operation on the status values of said operands; and while said hardware elements are performing each one of said sequence of steps of said arithmetic operation, performing said analogous simulated steps on said status values so that, for each intermediate or final arithmetic result produced by one of said hardware elements, said model produces a corresponding intermediate or final status result at a point in said model that corresponds to said hardware element, said intermediate or final status result being a function of the status values of the one or more operands operated on to produce said corresponding intermediate or final arithmetic result, said performing of said analogous simulated steps including (a) applying each said status indicator to said point in said model that corresponds to the hardware element that performs said arithmetic operation step, and (b) accumulating at each said point in said model said status indicator with said status values of the one or more operands operated on by said hardware element in performing said arithmetic operation step, (c) whereby the intermediate or final status results each represent an accumulation of the status of the steps of the arithmetic operation that are performed to produce the corresponding intermediate or final arithmetic result and represent the status values of the operands on which said steps are performed, and whereby the final status result produced by said model will represent the accumulated status of the execution of the arithmetic operation.

2. The method of claim 1 wherein said model comprises an exception processor having hardware elements corresponding to the hardware elements of the arithmetic processor.

3. The method of claim 2 wherein said arithmetic and exception processors are controlled by analogous stored programs.

4. The method of claim 2 wherein each said point corresponds to one of said hardware elements of said exception processor.

5. The method of claim 2 wherein an intermediate or final arithmetic result is located in one of said hardware elements of said arithmetic processor and has a corresponding intermediate or final status result that is located in a corresponding hardware element of said exception processor.

6. The method of claim 2 whereby said exception processor operates in parallel with said arithmetic processor in response to a common set of instructions.

7. A system for accumulating a status of execution of an arithmetic operation that comprises a sequence of steps, comprising an arithmetic processor having hardware elements for performing said sequence of steps, each said step being performed on one or more operands that have status values and producing an intermediate or final arithmetic result and is capable of producing a corresponding status indicator, means for simulating said hardware elements in a model that performs simulated steps on said status values analogous to the sequence of steps performed by said hardware elements on said operands that have said status values, said simulated steps including an accumulation operation on the status values of said one or more operands; and means for controlling the operation of said model so that, while said hardware elements are performing each one of said sequence of steps of said arithmetic operation, said model performs said analogous simulated steps on said status values so that, for each intermediate or final arithmetic result produced by one of said hardware elements, said model produces a corresponding intermediate or final arithmetic result produced by one of said hardware elements, said model produces a corresponding intermediate or final status result at a point in said model that corresponds to said hardware element, said intermediate or final status result being a function of the status values of the one or more operands operated on to produce said corresponding intermediate or final arithmetic result, said means for controlling causing said arithmetic processor to apply each said status indicator to said point in said model that corresponds to the hardware element that performs said arithmetic operation step, and said model including means for accumulating at each said point in said model said status indicator with said status values of the one or more operands operated on by said hardware element in performing said arithmetic operation step, whereby the intermediate or final status results each represent an accumulation of the status of the steps of the arithmetic operation that are performed to produce the corresponding intermediate or final arithmetic result and represent the status values of the operands on which said steps are performed, and whereby the final status result produced by said model will represent the accumulated status of the execution of the arithmetic operation.

8. The system of claim 7 wherein said model comprises an exception processor having hardware elements corresponding to the hardware elements of the arithmetic processor, said exception processor indicating whether an exception has occurred during the arithmetic operation in response to said status results.

9. The system of claim 8 wherein said arithmetic and exception processors are controlled by analogous stored programs.

10. The system of claim 8 wherein each said point corresponds to one of said hardware elements of said exception processor.

11. The system of claim 8 whereby said exception processor operates in parallel with said arithmetic processor in response to a common set of instructions.

12. The system of claim 7 wherein an intermediate or final arithmetic result is located in one of said hardware elements of said arithmetic processor and has a corresponding intermediate or final status result that is located in a corresponding hardware element of said exception processor.

* * * * *